United States Patent
Aida et al.

(10) Patent No.: US 9,410,107 B2
(45) Date of Patent: Aug. 9, 2016

(54) GREASE COMPOSITION AND GREASE-PACKED ROLLING BEARING

(75) Inventors: Ryo Aida, Suzuka (JP); Yutaka Imai, Fujisawa (JP); Kenta Sakaguchi, Anjo (JP)

(73) Assignees: KYODO YUSHI CO., LTD., Kanagawa (JP); NTN CORPORATION, Osaka (JP)

( * ) Notice: Subject to any disclaimer, the term of this patent is extended or adjusted under 35 U.S.C. 154(b) by 13 days.

(21) Appl. No.: 14/001,368

(22) PCT Filed: Mar. 5, 2012

(86) PCT No.: PCT/JP2012/055569
§ 371 (c)(1),
(2), (4) Date: Aug. 23, 2013

(87) PCT Pub. No.: WO2012/121212
PCT Pub. Date: Sep. 13, 2012

(65) Prior Publication Data
US 2013/0331306 A1 Dec. 12, 2013

(30) Foreign Application Priority Data

Mar. 4, 2011 (JP) ................................ 2011-047242
Apr. 4, 2011 (JP) ................................ 2011-082624

(51) Int. Cl.
| | | |
|---|---|---|
| *C10M 169/02* | (2006.01) | |
| *C10M 169/04* | (2006.01) | |
| *C10M 169/06* | (2006.01) | |
| *C10M 135/10* | (2006.01) | |
| *C10M 129/74* | (2006.01) | |
| *F16C 33/66* | (2006.01) | |
| *F16C 33/78* | (2006.01) | |
| *F16C 19/06* | (2006.01) | |
| *F16C 33/44* | (2006.01) | |

(52) U.S. Cl.
CPC ........... *C10M 169/04* (2013.01); *C10M 169/02* (2013.01); *C10M 169/06* (2013.01); *F16C 33/6633* (2013.01); *C10M 2207/026* (2013.01); *C10M 2207/283* (2013.01); *C10M 2207/2835* (2013.01); *C10M 2215/064* (2013.01); *C10M 2215/1026* (2013.01); *C10M 2217/0456* (2013.01); *C10M 2219/044* (2013.01); *C10M 2223/045* (2013.01); *C10N 2210/02* (2013.01); *C10N 2220/022* (2013.01); *C10N 2230/12* (2013.01); *C10N 2230/76* (2013.01); *C10N 2240/02* (2013.01); *C10N 2250/10* (2013.01); *F16C 19/06* (2013.01); *F16C 33/44* (2013.01); *F16C 33/7856* (2013.01)

(58) Field of Classification Search
CPC ............. C10M 169/02; C10M 169/04; C10M 169/06; C10M 2207/026; C10M 2207/283; C10M 2207/2835; C10M 2215/064; C10M 2215/1026; C10M 2219/044; C10M 2223/045; C10N 2210/02; C10N 2220/022; C10N 2230/12; C10N 2230/76; C10N 2240/02; C10N 2250/10; F16C 33/44; F16C 33/6633; F16C 33/7856; F16C 19/06
USPC .......................................... 508/409, 506, 528
See application file for complete search history.

(56) References Cited

U.S. PATENT DOCUMENTS

| | | |
|---|---|---|
| 5,059,336 A | 10/1991 | Naka et al. |
| 6,196,720 B1 | 3/2001 | Nozaki et al. |
| 6,251,841 B1 | 6/2001 | Koizumi et al. |
| 6,417,143 B1 | 7/2002 | Mikami et al. |
| 7,150,565 B1 * | 12/2006 | Koyama et al. ................ 384/450 |
| 8,153,568 B2 | 4/2012 | Sato et al. |
| 2002/0072477 A1 * | 6/2002 | Ikejima et al. ................. 508/181 |
| 2008/0026963 A1 * | 1/2008 | Sakamoto et al. ............ 508/218 |
| 2008/0196995 A1 * | 8/2008 | Mikami et al. ............... 192/41 R |
| 2009/0136172 A1 * | 5/2009 | Egami et al. .................. 384/589 |
| 2010/0093567 A1 * | 4/2010 | Endo et al. .................... 508/100 |
| 2011/0046030 A1 | 2/2011 | Imai et al. |

FOREIGN PATENT DOCUMENTS

| | | |
|---|---|---|
| CN | 101273117 A | 9/2008 |
| CN | 101321851 A | 12/2008 |

(Continued)

OTHER PUBLICATIONS

Chinese Office Action and Search Report dated Jun. 5, 2014, issued by the Chinese Patent Office in corresponding Chinese Patent Application No. 201280011298.5. (7 pages).

(Continued)

*Primary Examiner* — James Goloboy
(74) *Attorney, Agent, or Firm* — Buchanan, Ingersoll & Rooney PC

(57) ABSTRACT

A grease composition for a rolling bearing for a motor to support a rotor of the motor, containing a pentaerythritol ester base oil with a kinematic viscosity at 40° C. of 20 to 55 $mm^2/s$; 7 to 13 mass % of a diurea thickener represented by formula (A) where each R group is defined; and a rust inhibitor mixture selected from the group consisting of polyol ester type rust inhibitors and organic sulfonate type rust inhibitors. The grease composition can prevent a peculiar noise from being produced at low temperatures, satisfy the low torque performance over a wide temperature range, extend the bearing lubrication life even under the circumstances of high temperature, and exhibit excellent rust inhibiting effect on varnish.

Formula (A)

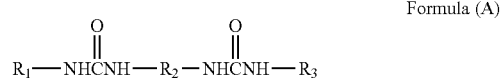

9 Claims, 2 Drawing Sheets

(56) References Cited

FOREIGN PATENT DOCUMENTS

| JP | 01-259097 A | 10/1989 |
| JP | 03-079698 A | 4/1991 |
| JP | 11-270566 A | 10/1999 |
| JP | 11-279578 A | 10/1999 |
| JP | 2000-198993 A | 7/2000 |
| JP | 2004-051912 A | 2/2004 |
| JP | 2004-116661 A | 4/2004 |
| JP | 2004-270929 A | 9/2004 |
| JP | 2005-232470 A | 9/2005 |
| JP | 2006-124429 A | 5/2006 |
| JP | 2010-106952 A | 5/2010 |
| WO | WO 2008/050834 A1 | 5/2008 |

OTHER PUBLICATIONS

International Search Report (PCT/ISA/210) mailed on Jun. 5, 2012, by Japanese Patent Office as the International Searching Authority for International Application No. PCT/JP2012/055569.

Written Opinion (PCT/ISA/237) mailed on Jun. 5, 2012, by Japanese Patent Office as the International Searching Authority for International Application No. PCT/JP2012/055569.

Suzuki et al., Cause and Prevention of Ball Bearing Rusting due to Insulating Varnish in Electric Motors, NSK Bearing Journal, 1982, No. 643 (partial translation of p. 17, left-hand column, line 2 to 26).

Chinese Office Action and Search Report issued on Nov. 2, 2015, by the Chinese Patent Office in corresponding Chinese Patent Application No. 201280011298.5 (8 pages).

Wei Bian: "Use and Technical Management of Car," A higher vocational planning textbook for $21^{th}$ century electromechanical specialty, recommended by Technical and Vocational Education Research Association of China, and Published by Xidian University Press, 2007, pp. 69-70 (with partial translation).

Shupei Li: "Petroleum Processing Technology (the second volume): a textbook for colleges and universities of petrochemical technology," published by China Petrochemical Press, Jan. 1992, pp. 178-180 (with partial translation).

Tingbin Zhu: "Full technical information of lubricating grease (Second edition)," published by China Petrochemical Press, Second edition, Oct. 2009, pp. 591-596 (with partial translation).

\* cited by examiner

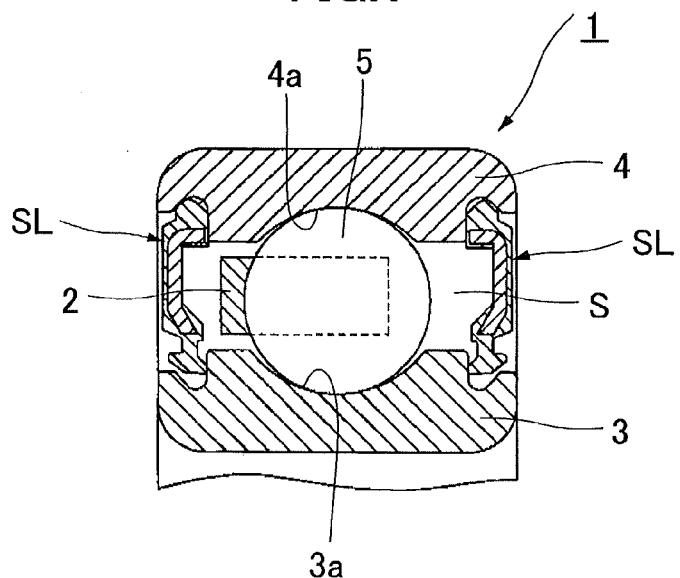
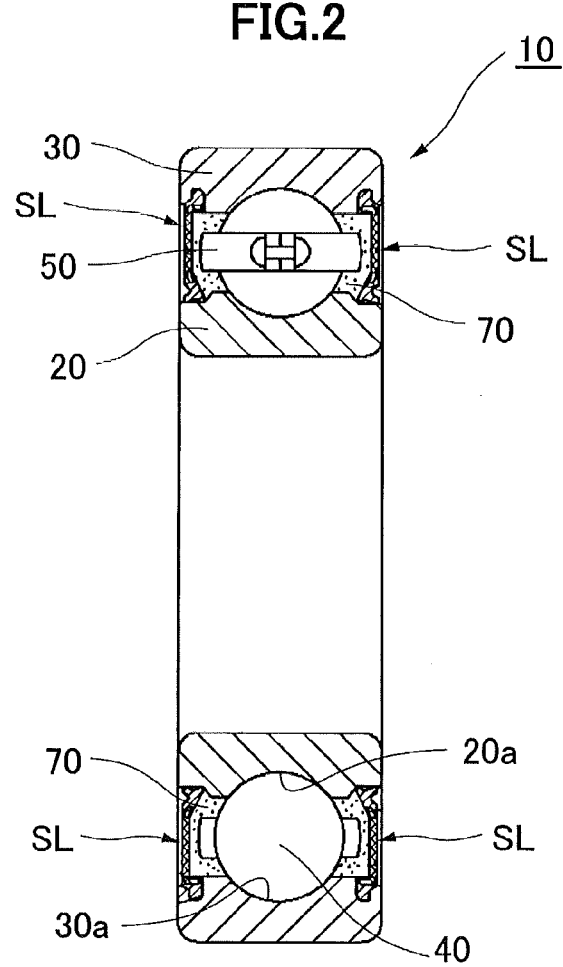

GREASE COMPOSITION AND GREASE-PACKED ROLLING BEARING

TECHNICAL FIELD

The present invention relates to a grease composition to be enclosed in a rolling bearing designed to support a rotor used in a variety of motors; and a rolling bearing for supporting a rotor of the motor, packed with the above-mentioned grease composition.

BACKGROUND ART

Motors used in the automobiles and various kinds of industrial machines are operated under various circumstances, for example, in a cold district or a high-temperature engine room. Therefore, bearings used for the motors are required to be practicable across a wide temperature range over a prolonged duration of time. Improvement of the motor efficiency has also been desired along with the recent increased environmental consciousness, so that the bearings used for the motor are strongly required to satisfy the low torque performance.

In addition, the bearing performance largely depends on the performance of grease enclosed in the bearing. In light of this, special attention should be paid to choice of grease. For example, when it is cold, the increased viscosity of the base oil used in the grease may readily produce the problem of uneven oil film on the raceway of a bearing. This will cause a minute periodic change in the coefficient of friction between the rolling element and the raceway and thus lead to self-excited vibration of the rolling element of bearing. Depending on the operating conditions, the self-excited vibration may produce a certain abnormal sound from the bearing, i.e., peculiar noise (peculiar noise at low temperature). To solve the above-mentioned problem, JP 11-270566 A discloses a grease composition where a particular base oil is contained at a specific ratio in order to lower the viscosity.

From the viewpoint of a recent tendency toward reduction in power consumption, electrical machinery and appliances and mechanical parts used in the automobiles as well as in various industries are required to have improved efficiency. Thus, various studies have been conducted to reduce the weight of parts and improve the structure. It also becomes important for the grease used together to show low torque performance across a wide temperature range from low temperatures up to high temperatures. The conventional step to improve the grease so as to satisfy the low torque performance was reduction of the kinematic viscosity of the employed base oil. For example, JP 2000-198993 A proposes a grease composition where a base oil comprises an ester oil with a kinematic viscosity at 40° C. of 10 mm²/s or more. However, when the kinematic viscosity of the base oil is reduced, the heat resistance of the base oil is so lowered at high temperatures that the seizure life will be unsatisfactory although the torque can be lowered.

In consideration of the operating environment of high temperatures, the grease selected is required to exhibit a long seizure life. To improve the seizure life under the circumstances of high temperatures, JP 1-259097 A proposes a grease composition comprising an alkyldiphenyl ether oil as an essential component and a particular thickener, for example. However, the above-mentioned grease cannot satisfy the low torque performance because of high kinematic viscosity of the base oil.

In the rolling bearings for motors, there is another special problem, i.e., rusting due to varnish. In this case, therefore, the grease is required to have a rust inhibiting effect. In terms of the grease, rather than ester type synthetic oils, mineral oils have been preferably selected for the base oil to improve the rust inhibiting effect on varnish (Suzuki, Tomaru, Yamamoto and Suzuki, "Cause and Prevention of Ball Bearing Rusting due to Insulating Varnish in Electric Motors", NSK Bearing Journal, No. 643, 1982). However, the grease composition using mineral oil as the base oil cannot satisfy the low torque performance over a wide temperature range as mentioned above, especially at low temperatures. In addition, the mineral oil is inferior to the synthetic oil in the heat resistance, so that a long seizure life cannot be attained under the circumstances of high temperatures.

JP 2004-51912 A proposes a grease composition where a polyol ester is used as the rust inhibitor and the base oil contains a synthetic hydrocarbon oil in an amount of 10 mass % or more.

In this case, however, the rust inhibiting effect on varnish as desired in the rolling bearing for motor cannot be obtained.

As previously explained, the grease used in the rolling bearing for motors is required to prevent a peculiar noise from being generated at low temperatures, exhibit low torque performance over a wide temperature range, show a long seizure life under the circumstances of high temperature, and exhibit excellent rust inhibiting effect. Any of the above-mentioned grease compositions cannot satisfy all the performance.

SUMMARY OF INVENTION

Technical Problem

Accordingly, an object of the invention is to provide a grease composition to be enclosed in a rolling bearing for supporting a rotor used in a motor, which grease composition can prevent generation of a peculiar noise at low temperatures, ensure the low torque performance across a wide temperature range, extend the bearing lubrication life even at high temperatures, and exhibit excellent rust inhibiting effect on varnish.

Another object of the invention is to provide a rolling bearing designed to support a rotor of the motor and packed with the above-mentioned grease composition.

Solution to Problem

The inventors of the present invention chose a particular thickener, base oil and rust inhibitor to achieve the objects, i.e., prevent a peculiar noise from being generated at low temperatures, ensure the low torque performance across a wide temperature range, extend the bearing lubrication life, and exhibit excellent rust inhibiting effect on varnish.

Namely, the invention provides the following grease composition:

1. A grease composition for a rolling bearing for a motor to support a rotor of the motor, comprising a thickener, a base oil and a rust inhibitor, wherein:

the thickener is a diurea compound represented by the following formula (A), which is contained in an amount of 7 to 13 mass % in the composition;

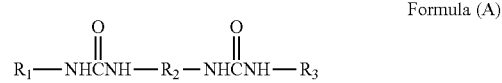

Formula (A)

wherein $R^2$ is a bivalent aromatic hydrocarbon group having 6 to 15 carbon atoms; and $R^1$ and $R^3$ each represents a cyclohexyl group or a straight-chain or branched alkyl group having 16 to 20 carbon atoms, with the ratio of the number of moles of the cyclohexyl group to the total number of moles of the cyclohexyl group and the straight-chain or branched alkyl group having 16 to 20 carbon atoms, as expressed by [((the number of cyclohexyl groups)/(the number of cyclohexyl groups+the number of straight-chain or branched $C_{16-20}$ alkyl groups))×100] being 60 to 90 mol %;

the base oil is a pentaerythritol ester oil having a kinematic viscosity at 40° C. of 20 to 55 mm²/s; and the rust inhibitor is a mixture of at least one selected from the group consisting of polyol ester type rust inhibitors and at least one selected from the group consisting of organic sulfonate type rust inhibitors.

2. The grease composition set out in the above-mentioned item 1, wherein the pentaerythritol ester oil has a pour point of −50° C. or less.

3. The grease composition set out in the above-mentioned item 1 or 2, wherein the polyol ester type rust inhibitor is sorbitan trioleate.

4. The grease composition set out in the above-mentioned item 1 or 2, wherein the organic sulfonate type rust inhibitor is zinc sulfonate.

5. A rolling bearing for a motor to support a rotor of the motor, wherein the grease composition set out in any one of the above-mentioned items 1 to 4 is enclosed.

6. The rolling bearing set out in the above-mentioned item 5, wherein the rolling bearing is a scaled bearing.

7. The rolling bearing set out in the above-mentioned item 5 or 6, wherein the rolling bearing comprises a resin-made cage.

Advantageous Effects of Invention

The invention can provide a grease composition to be enclosed in rolling bearings, which grease composition is capable of preventing generation of a peculiar noise at low temperatures, ensuring the low torque performance over a wide temperature range, extending the bearing lubrication life even at high temperatures, and exhibiting excellent rust inhibiting effect on varnish.

BRIEF DESCRIPTION OF DRAWINGS

FIG. 1 is a partial cross-sectional view of a deep-groove ball bearing according to one embodiment of the rolling bearing for motor in the invention.

FIG. 2 is a cross-sectional view of a deep-groove ball bearing according to another embodiment of the rolling bearing for motor in the invention.

DESCRIPTION OF EMBODIMENTS (Thickener)

Figure 3:
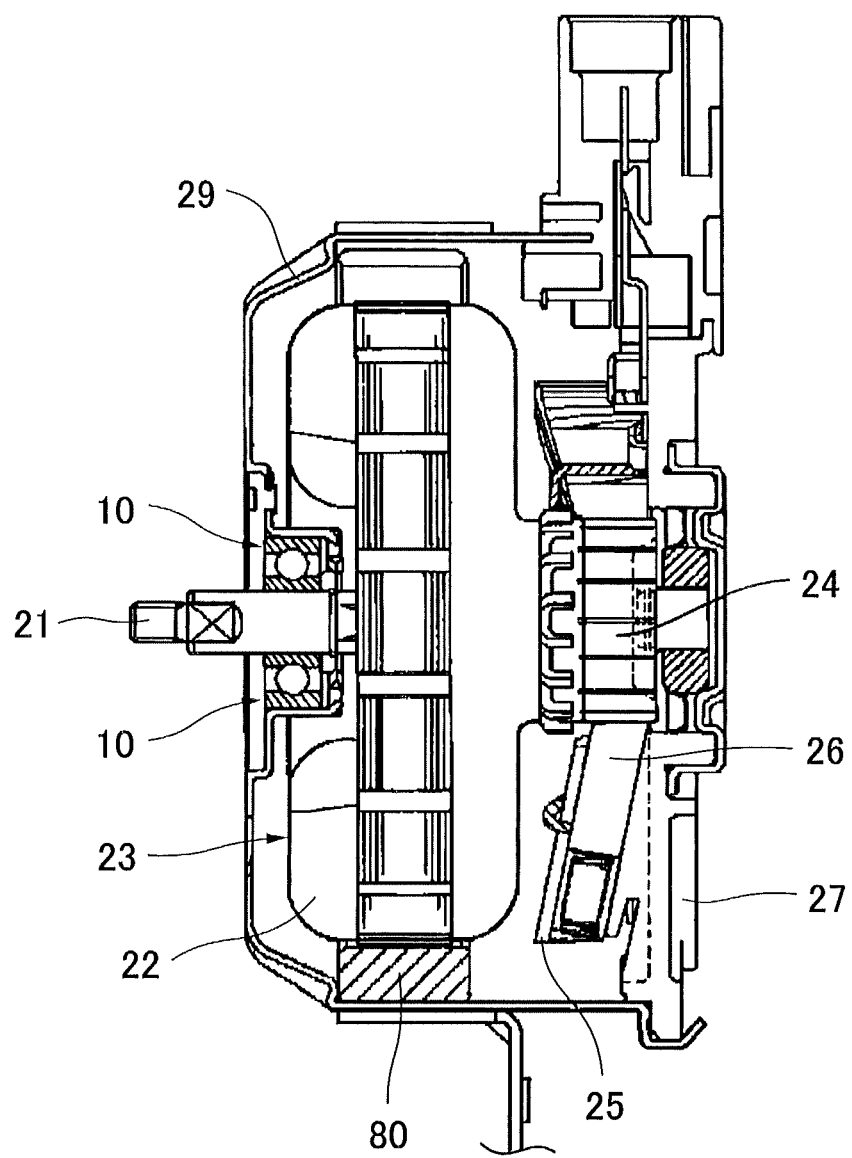
FIG. 3 is a diagram showing the structure of a motor using a rolling bearing for motor according to one embodiment of the invention.

The thickener used in the invention is represented by the above-mentioned formula (A).

In the formula (A), $R^1$ and $R^3$, which may be the same or different each represent cyclohexyl group or a straight-chain or branched alkyl group having 16 to 20 carbon atoms, preferably 18 carbon atoms.

$R^2$ is an aromatic hydrocarbon group having 6 to 15 carbon atoms. Representative examples are the aromatic hydrocarbon groups shown by the following structural formulas:

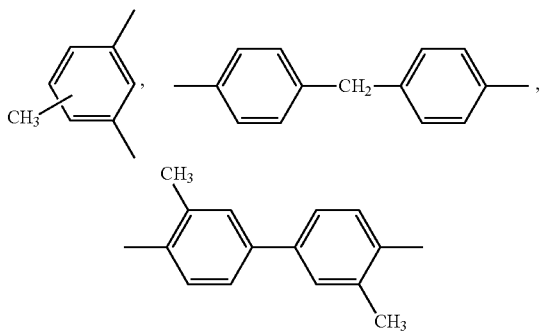

The ratio of the number of moles of the cyclohexyl group is 60 to 90 mol %, preferably 70 to 80 mol %. The ratio of the number of moles of the cyclohexyl group can be adjusted by changing the amount ratio of raw materials constituting the thickener of formula (A).

Use of the above-mentioned thickener can reduce the content of thickener that is responsible for torque, so that the low torque performance can be satisfied over a wide temperature range. In addition, the thickener of formula (A) has such excellent heat resistance even at high temperatures that the resultant grease composition of the invention can exhibit a long lubricating life.

In general, metallic soaps containing lithium, sodium or the like, and non-soaps such as Benton, silica gel, diurea compounds, fluorine-containing thickeners such as polytetrafluoroethylene and the like are conventionally used as the thickeners. The metallic soaps, Benton and silica gel are not satisfactory in terms of the heat resistance, that is, the bearing lubrication life at high temperatures. The fluorine-containing thickeners are considerably expensive and lacking in versatility although the heat resistance is satisfactory.

The content of the thickener is 7 to 13 mass %, preferably 8 to 13 mass %, based on the total mass of the grease composition according to the invention. When the content is less than 7 mass %, the resultant grease will become soft, so that there may be a risk If leakage, which may not satisfy the long lubricating life. When the content exceeds 13 mass %, the low torque performance cannot be achieved.

(Base Oil)

The base oil used in the invention is a pentaerythritol ester oil having a kinematic viscosity at 40° C. of 20 to 55 mm²/s. The kinematic viscosity at 40° C. may preferably be 25 to 50 mm²/s, and more preferably 25 to 40 mm²/s. When the kinematic viscosity at 40° C. of the base oil exceeds 55 mm²/s, it is difficult to prevent a peculiar noise from being generated at low temperatures and satisfy the low torque performance over a wide temperature range although the heat resistance is excellent. On the other hand, when the kinematic viscosity at 40° C. of the base oil is less than 20 mm²/s, the heat resistance becomes too low to ensure a sufficient lubricating life, although it is possible to prevent a peculiar noise from being produced at low temperatures and satisfy the low torque performance over a wide temperature range. The kinematic viscosity at 40° C. can be determined in accordance with JIS K2220 23.

(Rust Inhibitor)

As the rust inhibitor for use in the invention, a mixture of at least one selected from the group consisting of polyol ester type rust inhibitors and at least one selected from the group consisting of organic sulfonate type rust inhibitors is employed. The above-mentioned rust inhibitor can avoid the problem of rusting due to varnish.

Suitable examples of the polyol ester type rust inhibitors include sorbitan trioleate and sorbitan monooleate. In particular, sorbitan trioleate is preferable.

Suitable examples of the organic sulfonate type rust inhibitors include zinc sulfonate and calcium sulfonate. In particular, zinc sulfonate is preferable.

The content of the rust inhibitor may preferably be 1 to 5 mass %, and more preferably 2 to 4 mass %, based on the total mass of the grease composition according to the invention.

When necessary, the grease composition of the invention may further comprise other additives generally used in the conventional grease enclosed in the rolling bearings designed to support a rotor of the motor.

Examples of other additives include an antioxidant such as amine-based and phenol-based antioxidants; an inorganic passivator such as sodium nitrite or the like; any other rust inhibitor than polyol ester type rust inhibitors and organic sulfonate type rust inhibitors, e.g., amine-based and carboxylate-based rust inhibitors; a metallic corrosion inhibitor such as benzotriazole or the like; an oiliness improver such as fatty acids, fatty acid esters, phosphates and the like; a phosphorus-containing, sulfur-containing or organic metal-containing antiwear agent or extreme-pressure agent; and a solid lubricant such as oxidized metal salts, molybdenum disulfide or the like.

The grease may be subjected to oxidative deterioration especially under the circumstances of high temperature. In light of this, it is desirable to use the amine-based antioxidant and the phenol-based antioxidant in combination rather than to use singly. When consideration is given to anti-flaking properties, the organic sulfonate rust inhibitor may be used together with a load carrying additive.

The worked penetration of the composition according to the invention can appropriately be adjusted, but preferably 200 to 350, and more preferably 240 to 320.

(Rolling Bearing for Motor)

The motors with rolling bearings where the composition of the invention can be enclosed include general-purpose motors, motors for automobiles and motors for industrial machines. Examples of the general-purpose motors include AC motors, DC motors and the like. Examples of the automobile motors include driving motors for electric vehicle (EV) and hybrid electric vehicle (HEV), electric compressor motors, electric fan motors, ABS pump motors, starter motors, wiper motors, power window motors, electric power steering motors, steering adjustment tilt motors, blower motors and the like. Examples of the motors for industrial machines include motors for production facilities, blowers, pumps and compressors, servo-motors, and the like.

The rolling bearings designed to support a rotor of the motor and to be packed with the grease composition of the invention include a deep-groove ball bearing, angular contact ball bearing, cylindrical roller bearing, tapered roller bearing, self-aligning roller bearing, needle roller bearing, thrust cylindrical roller bearing, thrust tapered roller bearing, thrust self-aligning roller bearing and the like.

The bearing may preferably be of a sealed type.

The above-mentioned bearing may comprise a resin-made cage or iron-made cage.

Preferably, the above-mentioned bearing may comprise a resin-made cage. The materials for the resin-made cage, especially for the inner ring and outer ring, may preferably be polyamide 66 (PA66), polyamide 46 (PA46), polyamide 9T (PA9T), polyamide 11 (PA11), polyamide 6 (PA6), polyphenylene sulfide (PPS), polyether ether ketone (PEEK) and the like.

The structure of the rolling bearing for supporting a rotor of the motor where the grease composition according to a preferred embodiment of the invention is enclosed will now be explained.

FIG. 1 is a partial cross-sectional view of a rolling bearing 1 for motor employing a resin-made cage. The rolling bearing 1 is a sealed type single-row deep-groove ball bearing comprising a plurality of spherical balls (rolling elements) 5, a resin-made cage 2 for retaining the balls 5, an inner ring 3, and an outer ring 4 which is disposed so as to be concentrically separated from the inner ring 3 in the radius direction.

On the outer periphery of the inner ring 3, a plurality of inward dented portions 3a in a hemispherical form are formed at given angular intervals. On the inner periphery of the outer ring 4, a plurality of outward dented portions 4a in a hemispherical form are formed in the radius direction corresponding to the inward dented portions 3a. The spherical rolling elements 5 are individually arranged between the inward dented portion 3a and the corresponding outward dented portion 4a.

A ring-shaped space (S) formed between the inner ring 3 and the outer ring 4 which are separated from each other in the radius direction is tightly sealed by attaching ring-shaped seals (SL) each to the inside end and the outside end of the space (S) in the direction of a shaft. In the tightly sealed ring-shaped space (S) a grease composition of the invention is enclosed.

FIG. 2 is a cross-sectional view of a rolling bearing 10 for motor, which employs an iron-made cage.

The rolling bearing 10 is a sealed type single-row deep-groove ball bearing comprising a plurality of spherical balls (rolling elements) 40, an iron-made cage 50 for retaining the balls 40, an inner ring 20, and an outer ring 30 which is disposed so as to be concentrically separated from the inner ring 20 in the radius direction.

On the outer periphery of the inner ring 20, a plurality of inward dented portions 20a in a hemispherical form are formed at given angular intervals. On the inner periphery of the outer ring 30, a plurality of outward dented portions 30a in a hemispherical form are formed in the radius direction corresponding to the inward dented portions 30a. The spherical rolling elements 40 are individually arranged between the inward dented portion 20a and the corresponding outward dented portion 30a.

A ring-shaped space (S) formed between the inner ring 20 and the outer ring 30 which are separated from each other in the radius direction is tightly sealed by attaching ring-shaped seals (SL) each to the inside end and the outside end of the space (S) in the direction of a shaft. In the tightly sealed ring-shaped space (S) a grease composition 70 of the invention is enclosed.

FIG. 3 is a diagram showing the structure of a motor where the rolling bearing 10 for motor as shown in FIG. 2 is employed.

The motor is provided with a stator 80 which is disposed on an inner wall of a jacket 29 and consists of a magnet for motor, and a rotor 23 which is wound with winding 22 and fixed to a rotating shaft 21.

The motor is further equipped with a commutator 24 fixed to the rotating shaft 21, a brush holder 25 disposed on an end frame 27 that is supported by the jacket 29, and a brush 26 enclosed in the brush holder 25.

The rotating shaft 21 of the motor is rotatably supported by the jacket 29 via the deep-groove ball bearing 10 shown in FIG. 2 and a structure for supporting the deep-groove ball bearing 10.

In the above embodiment of FIG. 3, the rolling bearing 10 for motor as shown in FIG. 2 is used, but the rolling bearing 1 for motor as shown in FIG. 1 which uses a resin-made cage may also he used.

EXAMPLES

<Preparation of Sample Greases>

By using thickeners, base oils and additives shown in Tables 1 and 2, grease compositions according to Examples and Comparative Examples were prepared. The content of the base oil was determined so that the total amount of the base oil, the thickener and the additives might reach 100 mass %. To be more specific, diphenylmethane diisocyanate was reacted with predetermined amines in the base oil, and the reaction mixture was heated and then cooled, thereby obtaining a base grease. To the base grease thus obtained, the predetermined additives and the rest of base oil were added, and the resultant mixture was mixed using a three roll mill Then, grease compositions according to Examples 1 to 6 and Comparative Examples 1 to 10 were obtained so as to have a worked penetration of 280 to 350 (as determined in accordance with the JIS K2220 7.). The kinematic viscosity of each base oil at 40° C. was determined in accordance with JIS K2220 23.

<Base Oil>

Ester oil A: pentaerythritol ester oil with a kinematic viscosity at 40° C. of 33 mm$^2$/s and a pour point of −52.5° C.

Ester oil B: pentaerythritol ester oil with a kinematic viscosity at 40° C. of 29 mm$^2$/s and a pour point of −50° C.

Ester oil C: pentaerythritol ester oil with a kinematic viscosity at 40° C. of 38 mm$^2$/s and a pour point of −55° C.

Ester oil D: dipentaerythritol ester oil with a kinematic viscosity at 40° C. of 220 mm$^2$/s and a pour point of −30° C.

Ester oil E: trimethylolpropane ester oil with a kinematic viscosity at 40° C. of 19 mm$^2$/s and a pour point of −45° C.

Ether oil: alkyldiphenyl ether oil with a kinematic viscosity at 40° C. of 97 mm$^2$/s and a pour point of −30° C.

Synthetic hydrocarbon oil: poly(a-olefin) with a kinematic viscosity at 40° C. of 30 mm$^2$/s and a pour point of −65° C.

Mineral oil: with a kinematic viscosity at 40° C. of 39 mm$^2$/s and a pour point of −12.5° C.

<Rust Inhibitor>

Sorbitan trioleate

Zn sulfonate: zinc dinonylnaphthalene sulfonate

<Antioxidant>

Amine-based antioxidant

Phenol-based antioxidant

<Load Carrying Additive>

ZnDTP: zinc dithiophosphate

<Test Methods>

Peculiar Noise at Low Temperatures

A given amount of grease was enclosed in a predetermined bearing, which was set into a bearing rotation testing machine. After the bearing was sufficiently cooled, the motor was started to rotate the inner ring of the bearing, and the number of revolutions was increased to 4000 rpm in 30 seconds. During the above-mentioned time period of 30 seconds, it was aurally confirmed whether there was a peculiar noise or not.

Bearing type: 6206
Amount of packed grease: 25% of the volume of total space
Test load: Radial load of 2 kgf
Number of revolutions: 0 to 4000 rpm
Time taken to reach the maximum number of revolutions: 30 seconds
Test temperature: −40° C.
Number of repeated tests: 3

Low Torque Performance (at Low Temperature)

The test was conducted at −40° C. in accordance with a low temperature torque test defined by JIS K2220 18.

The bearing was continuously rotated over a period of 10 minutes, and the readings were taken from the torque measuring instrument for the last 15 seconds and the rotational torque was then calculated from the average of the above-mentioned readings.

Low Torque Performance (at Room Temperature)

A given amount of grease was enclosed in a predetermined hearing, which was set into a bearing torque tester. The motor was started to rotate the inner ring of the bearing at a predetermined number of revolutions. At that time, the load applied to the outer ring of the test bearing was read using a load cell.

The test conditions are shown below. When the torque became stable, the stable torque was regarded as the rotational torque.

Bearing type: 6203LB (material of the cage: PA66 containing 25 mass % of glass fiber)
Amount of packed grease: 80% of the volume of stationary air space
Test load: radial load of 200 N
Number of revolutions: 4000 rpm
Ambient temperature: 25° C.

Heat Resistance (Bearing Lubrication Life)

The test was conducted using a bearing lubrication life tester in accordance with ASTM D3336.

The test conditions are shown below. The time taken until the motor produced overcurrent (4 ampere) or the bearing temperature increased by +15° C. was regarded as the seizure life.

Bearing type: 6204 metal seal
Test temperature: 180° C.
Number of revolutions: 10000 rpm
Amount of grease: 1.8 g
Test loads: axial load of 66.7 N and radial load of 66.7 N Rust Inhibiting Effect The test conditions are shown below. It was visually inspected whether the bearing gathered rust or not after the predetermined hours at the predetermined temperatures, to decide whether the grease composition to be acceptable or not.

Bearing type: 4T-30204
Test temperatures and hours: One cycle consisted of 22 hours at 40° C. and then two hours at 25° C. The above-mentioned cycle was repeated 4 times.
Amount of grease: 9 mg
Varnish: mixture of NV-5501 and catalyst No. 6A (made by Nitto Denko Corporation.) at a ratio by mass of 100:1

The test method is as follows. In this test, only the outer ring of the bearing was used. The outer ring of bearing to be subjected to the test was cleaned with n-hexane, and then the outer ring race was coated with 9 mg of each grease composition. A filter paper (50 mm×400 mm) was folded at intervals of 2 cm, and immersed in the predetermined varnish for 15 minutes. After the filter paper was taken out from the varnish, the filter paper was allowed to stand at room temperature for 30 minutes and then dried at 130° C. for 30 minutes. The dried varnish-immersed filter was placed into a 500-mL beaker. A glass petri dish was gently laid on the filer, and the test bearing coated with grease was allowed to stand still on the dish. The 500-mL beaker was placed in a 1-L beaker where 50 mL of distilled water was put, and then the 1-L beaker was tightly sealed with a polyethylene sheet. The test was conducted under the conditions of the predetermined temperatures, hours, and number of repeated cycles. After the test, it was visually inspected whether the outer ring race of the bearing gathered rust or not.

Evaluation

Peculiar Noise at Low Temperatures

It was confirmed whether some peculiar noise was heard or not.

No peculiar noise was heard throughout the repeated cycles (n=3): acceptable (o)

A peculiar noise was heard during even one out of three cycles: unacceptable (x)

Low Torque Performance

Rotational torque at low temperature less than 100 mNm: acceptable (o)

100 mNm or more: unacceptable (x)

Rotational torque at room temperature less than 10 mNm: acceptable (o)

10 mNm or more: unacceptable (x)

Heat Resistance

Bearing lubrication life 200 hours or more: acceptable (o)

less than 200 hours: unacceptable (x)

Rust Inhibiting Effect

Absence of rust: acceptable (o)

Presence of rust: unacceptable (x)

Overall Evaluation

When evaluated as acceptable in all the tests (peculiar noise at low temperature, low torque performance (at low temperature and room temperature), heat resistance and rust inhibiting effect): Pass (o)

When evaluated as unacceptable in any one of the tests (peculiar noise at low temperature, low torque performance (at low temperature and room temperature), heat resistance and rust inhibiting effect): Fail (x)

TABLE 1

| | | | Ex. 1 | Ex. 2 | Ex. 3 | Ex. 4 | Ex. 5 | Ex 6 |
|---|---|---|---|---|---|---|---|---|
| Thickener (molar ratio) | Diphenylmethane diisocyanate | | 50 | 50 | 50 | 50 | 50 | 50 |
| | Mono-amine | Cyclohexylamine | 75 | 60 | 90 | 75 | 75 | 75 |
| | | Octadecylamine | 25 | 40 | 10 | 25 | 25 | 25 |
| Base oil (ratio by mass) | Ester oil A | | 100 | 100 | 100 | 100 | | |
| | Ester oil B | | | | | | 100 | |
| | Ester oil C | | | | | | | 100 |
| | Ester oil D | | | | | | | |
| | Ester oil E | | | | | | | |
| | Ether oil | | | | | | | |
| | Synthetic hydrocarbon oil | | | | | | | |
| | Mineral oil | | | | | | | |
| Additives (mass %) | Rust inhibitor | Sorbitan trioleate | 1 | 1 | 1 | 1 | 1 | 1 |
| | | Zn sulfonate | 2 | 2 | 2 | 2 | 2 | 2 |
| | Antioxidant | Amine-based antioxidant | 2 | 2 | 2 | 2 | 2 | 2 |
| | | Phenol-based antioxidant | 1 | 1 | 1 | 1 | 1 | 1 |
| | Load carrying additive | ZnDTP | 1 | 1 | 1 | 1 | 1 | 1 |
| Amount of thickener (mass %) | | | 11 | 12 | 13 | 9 | 11 | 11 |
| Kinematic viscosity of base oil (40° C.) (mm$^2$/s) | | | 33 | 33 | 33 | 33 | 29 | 38 |
| Worked penetration | | | 280 | 280 | 280 | 310 | 280 | 280 |
| Peculiar noise at low temperature | Presence or absence of peculiar noise | | absence | absence | absence | absence | absence | absence |
| | Evaluation | | o | o | o | o | o | o |
| Low torque performance | Rotational torque (mNm) (low temp.: −40° C.) | | 70 | 80 | 90 | 60 | 70 | 80 |
| | Rotational torque (mNm) (room temp.: 25° C.) | | 3.2 | 5.9 | 6.7 | 3.0 | 3.0 | 6.5 |
| | Evaluation | | o | o | o | o | o | o |
| Heat resistance | Bearing lubrication life (hours) (180° C.) | | 200< | 200< | 200< | 200< | 200< | 200< |
| | Evaluation | | o | o | o | o | o | o |
| Rust inhibiting effect | Varnish rust test (Presence or absence of rust) | | absence | absence | absence | absence | absence | absence |
| | Evaluation | | o | o | o | o | o | o |
| Overall evaluation | | | o | o | o | o | o | o |

TABLE 2

| | | | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|---|---|---|---|---|
| Thickener (molar ratio) | Diphenylmethane diisocyanate | | 50 | 50 | 50 | 50 | 50 | 50 | 50 | 50 | 50 | 50 |
| | Mono-amine | Cyclo-hexylamine | 50 | 100 | 75 | 75 | 75 | 75 | 75 | 75 | 75 | 75 |
| | | Octa-decylamine | 50 | 0 | 25 | 25 | 25 | 25 | 25 | 25 | 25 | 25 |
| Base oil (ratio by mass) | Ester oil A | | 100 | 100 | | | | 50 | 100 | 100 | 100 | |
| | Ester oil B | | | | | | | | | | | |
| | Ester oil C | | | | | | | | | | | |
| | Ester oil D | | | | | | | 50 | | | | |
| | Ester oil E | | | | | | | | | | | 100 |

TABLE 2-continued

|  |  |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|---|---|---|---|---|
|  | Ether oil |  |  |  | 100 |  |  |  |  |  |  |  |
|  | Synthetic hydrocarbon oil |  |  |  |  | 100 |  |  |  |  |  |  |
|  | Mineral oil |  |  |  |  |  | 100 |  |  |  |  |  |
| Additives (mass %) | Rust inhibitor | Sorbitan trioleate | 1 | 1 | 1 | 1 | 1 | 1 | 1 |  | 1 | 1 |
|  |  | Zn sulfonate | 2 | 2 | 2 | 2 | 2 | 2 |  | 2 | 2 | 2 |
|  | Antioxidant | Amine based antioxidant | 2 | 2 | 2 | 2 | 2 | 2 | 2 | 2 | 2 | 2 |
|  |  | Phenol based antioxidant | 1 | 1 | 1 | 1 | 1 | 1 | 1 | 1 | 1 | 1 |
|  | Load carrying additive | ZnDTP | 1 | 1 | 1 | 1 | 1 | 1 | 1 | 1 | 1 | 1 |
| Amount of thickener (mass %) |  |  | 14 | 17 | 12 | 13 | 13 | 11 | 11 | 11 | 6 | 11 |
| Kinematic viscosity of base oil (40° C.) (mm²/s) |  |  | 33 | 33 | 97 | 30 | 39 | 65 | 33 | 33 | 33 | 19 |
| Worked penetration |  |  | 280 | 280 | 280 | 280 | 280 | 280 | 280 | 280 | 350 | 280 |
| Peculiar noise at low temperature | Presence or absence of peculiar noise |  | presence | presence | presence | absence | presence | presence | absence | Absence | Absence | Absence |
|  | Evaluation |  | x | x | x | ○ | x | x | ○ | ○ | ○ | ○ |
| Low torque performance | Rotational torque (mNm) (low temp.: −40° C.) |  | 120 | 140 | 480 | 70 | 1300< | 400 | 70 | 70 | 50 | 60 |
|  | Rotational torque (mNm) (room temp.: 25° C.) |  | 11.2 | 18.1 | 229.5 | 7.0 | 7.8 | 19.1 | 3.3 | 3.6 | 2.9 | 3.0 |
|  | Evaluation |  | x | x | x | ○ | x | x | ○ | ○ | ○ | ○ |
| Heat resistance | Bearing lubrication life (hours) (180° C.) |  | 200< | 200< | 200< | 150 | 90 | 200< | 200< | 200< | 180 | 170 |
|  | Evaluation |  | ○ | ○ | ○ | x | x | ○ | ○ | ○ | x | x |
| Rust inhibiting effect | Varnish rust test (Presence or absence of rust) |  | absence | absence | absence | absence | absence | absence | presence | presence | absence | absence |
|  | Evaluation |  | ○ | ○ | ○ | ○ | ○ | ○ | x | x | ○ | ○ |
| Overall evaluation |  |  | x | x | x | x | x | x | x | x | x | x |

The grease compositions of Examples 1 to 6 comprising a pentaerythritol ester base oil with a kinematic viscosity at 40° C. of 20 to 55 mm²/s, the particular diurea thickener in an amount of 7 to 13 mass %, and a polyol ester type rust inhibitor and an organic sulfonate type rust inhibitor were acceptable in all the test items of peculiar noise at low temperature, low torque performance, heat resistance and rust inhibiting effect.

On the other hand, the grease compositions of Comparative Examples 1 to 10 where any of the above-mentioned components was absent were not acceptable in one or more test items of peculiar noise' at low temperature, low torque performance, heat resistance and rust inhibiting effect.

EXPLANATION OF REFERENCES

1 Rolling bearing
2 Cage
3 Inner ring
4 Outer ring
5 Ball (Rolling element)
S Ring-shaped space
SL Ring-shaped seal
10 Rolling bearing
20 Inner ring
30 Outer ring
40 Ball (Rolling element)
50 Cage
70 Grease composition
21 Rotating shaft
22 Winding
23 Rotor
24 Commutator
25 Brush holder
26 Brush
27 End frame
29 Jacket
80 Stator

The invention claimed is:

1. A grease composition for a rolling bearing for a motor to support a rotor of the motor, comprising a thickener, a base oil and a rust inhibitor, wherein:
the thickener is a diurea compound represented by formula (A), which is contained in an amount of 7 to 13 mass % in the composition;

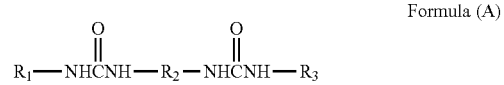

Formula (A)

wherein $R^2$ is a bivalent aromatic hydrocarbon group having 6 to 15 carbon atoms; and $R^1$ and $R^3$ each represents a cyclohexyl group or a straight-chain or branched alkyl group having 16 to 20 carbon atoms, with the ratio of the number of moles of the cyclohexyl group to the total number of moles of the cyclohexyl group and the straight-chain or branched alkyl group having 16 to 20 carbon atoms, as expressed by [((the number of cyclohexyl groups)/(the number of cyclohexyl groups + the number of straight-chain or branched $C_{16-20}$ alkyl groups))×100] being 60 to 90 mol %;
the base oil is a pentaerythritol ester oil having a kinematic viscosity at 40° C. of 20 to 55 mm²/s; and
the rust inhibitor is a mixture of sorbitan trioleate and zinc sulfonate, and
the total content of the rust inhibitor is 2 to 5 mass % based on the total mass of the grease composition with the minimum content of sorbitan trioleate being 1 mass % and the minimum content of zinc sulfonate being 1 mass %.

2. The grease composition of claim 1, wherein the pentaerythritol ester oil has a pour point of −50° C. or less.

3. A rolling bearing for a motor to support a rotor of the motor, wherein the grease composition of claim 1 is enclosed.

4. The rolling bearing of claim 3, wherein the rolling bearing is a sealed bearing.

5. The rolling bearing of claim 3, wherein the rolling bearing comprises a resin-made cage.

6. A rolling bearing for a motor to support a rotor of the motor, wherein the grease composition of claim 2 is enclosed.

7. The rolling bearing of claim 6, wherein the rolling bearing is a sealed bearing.

8. The rolling bearing of claim 6, wherein the rolling bearing comprises a resin-made cage.

9. The grease composition of claim 1 wherein the content of the thickener is 8 to 13 mass % based on the total mass of the grease composition.

\* \* \* \* \*